United States Patent
Kubica et al.

[11] Patent Number: 5,990,869
[45] Date of Patent: Nov. 23, 1999

[54] FORCE FEEDBACK MOUSE

[75] Inventors: Eric Gregory Kubica, Waterloo; Kevin Lloyd Tuer, Stratford; Daniel Richard Madill; Kevin Brian Krauel, both of Waterloo, all of Canada

[73] Assignee: Alliance Technologies Corp., Kitchener, Canada

[21] Appl. No.: 08/802,581

[22] Filed: Feb. 19, 1997

Related U.S. Application Data

[60] Provisional application No. 60/024,425, Aug. 20, 1996.

[51] Int. Cl.$^6$ .............................. G06F 3/033; G09G 5/08
[52] U.S. Cl. .......................... 345/163; 345/161; 345/157; 345/167; 33/1 M
[58] Field of Search ...................................... 345/156, 157, 345/184, 173, 168, 161, 163, 167; 33/1 M

[56] References Cited

U.S. PATENT DOCUMENTS

| | | |
|---|---|---|
| 2,424,773 | 7/1947 | Rieber . |
| 2,984,720 | 5/1961 | Fisher . |
| 3,091,130 | 5/1963 | Payerle et al. . |
| 3,550,466 | 12/1970 | Ham . |
| 3,701,963 | 10/1972 | Kasazima . |
| 3,707,093 | 12/1972 | Worden . |
| 3,919,691 | 11/1975 | Noll . |
| 3,940,674 | 2/1976 | Gill . |
| 4,127,841 | 11/1978 | Kato et al. . |
| 4,200,780 | 4/1980 | Romano . |
| 4,216,467 | 8/1980 | Colston . |
| 4,414,438 | 11/1983 | Maier et al. . |
| 4,459,578 | 7/1984 | Sava et al. . |
| 4,491,325 | 1/1985 | Bersheim . |
| 4,509,383 | 4/1985 | Yeh . |
| 4,532,817 | 8/1985 | Chaki . |
| 4,533,899 | 8/1985 | Isaksson . |
| 4,584,443 | 4/1986 | Yaeger . |
| 4,590,339 | 5/1986 | Scott-Jackson et al. . |
| 4,604,016 | 8/1986 | Joyce . |
| 4,660,828 | 4/1987 | Weiss . |
| 4,685,678 | 8/1987 | Frederiksen . |
| 4,692,756 | 9/1987 | Clark . |
| 4,748,441 | 5/1988 | Brzezinski . |
| 4,766,423 | 8/1988 | Ono et al. . |
| 4,769,517 | 9/1988 | Swinney . |
| 4,782,327 | 11/1988 | Kley et al. . |
| 4,800,721 | 1/1989 | Cemenska et al. . |
| 4,814,682 | 3/1989 | Yamada . |

(List continued on next page.)

FOREIGN PATENT DOCUMENTS

| | | |
|---|---|---|
| 0489469 | 11/1991 | European Pat. Off. . |
| 56-183116 | 11/1981 | Japan . |
| 05150795 | 6/1993 | Japan . |
| 2260389 | 4/1993 | United Kingdom . |
| 9607965 | of 1996 | WIPO . |
| 9618942 | of 1996 | WIPO . |

OTHER PUBLICATIONS

Dynamic Systems and Control, vol. 1, ASME 1994 "On the Development of a Force–Feedback Mouse and its Integration into a Graphical User Interface".

Fukui et al., "Edge Tracing of Virtual Shape Using Input Device with Force Feedback", 1992, vol. 23, pp. 94–104.

Szakaly et al., "Force–Feedback Cursor Control", May 1990, p. 413.

Hirota et al., "Development of Surface Display", pp. 256–262, Sep. 18, 1993.

*Primary Examiner*—Daniel J. Wu
*Attorney, Agent, or Firm*—Howard & Howard

[57] ABSTRACT

A computer interface includes an input device and display connected to a CPU. The input device generally comprises a mouse movable along an X-axis or Y-axis, resulting in a corresponding movement of a cursor on the display. A pair of motors impart a force upon the mouse along the X-axis and the Y-axis. The motors provide force feedback based upon movement of the mouse and based upon interaction of the cursor with objects displayed on the display.

47 Claims, 5 Drawing Sheets

U.S. PATENT DOCUMENTS

| | | |
|---|---|---|
| 4,820,162 | 4/1989 | Ross . |
| 4,868,549 | 9/1989 | Affinito et al. . |
| 4,870,389 | 9/1989 | Ishiwata et al. . |
| 4,879,556 | 11/1989 | Duimel . |
| 4,908,791 | 3/1990 | Giorgio . |
| 4,947,701 | 8/1990 | Hegg . |
| 4,961,138 | 10/1990 | Gorniak . |
| 4,962,448 | 10/1990 | DeMaio et al. . |
| 5,059,789 | 10/1991 | Salcudena . |
| 5,086,296 | 2/1992 | Clark . |
| 5,087,904 | 2/1992 | DeVolpi . |
| 5,103,404 | 4/1992 | McIntosh . |
| 5,146,566 | 9/1992 | Hollis, Jr. et al. . |
| 5,186,629 | 2/1993 | Rohen . |
| 5,189,355 | 2/1993 | Larkins et al. . |
| 5,191,320 | 3/1993 | MacKay . |
| 5,223,828 | 6/1993 | McKiel, Jr. . |
| 5,228,356 | 7/1993 | Chuang . |
| 5,305,429 | 4/1994 | Sato et al. ............................... 395/119 |
| 5,345,214 | 9/1994 | Tsui . |
| 5,354,162 | 10/1994 | Burdea et al. . |
| 5,374,924 | 12/1994 | McKiel, Jr. . |
| 5,377,950 | 1/1995 | Salcudena et al. . |
| 5,382,885 | 1/1995 | Salcudean et al. . |
| 5,396,266 | 3/1995 | Brimhall . |
| 5,429,140 | 7/1995 | Burdea et al. . |
| 5,491,477 | 2/1996 | Clark et al. . |
| 5,506,605 | 4/1996 | Paley . |
| 5,513,100 | 4/1996 | Parker et al. . |
| 5,576,727 | 11/1996 | Rosenberg et al. ..................... 345/179 |
| 5,709,219 | 1/1998 | Chen et al. ............................. 128/782 |
| 5,724,068 | 3/1998 | Sanchez et al. ........................ 345/161 |
| 5,739,811 | 4/1998 | Rosenberg et al. ..................... 345/161 |
| 5,742,278 | 4/1998 | Chen et al. ............................. 345/156 |
| 5,800,177 | 9/1998 | Gillio ...................................... 434/262 |

FORCE FEEDBACK MOUSE

This application claims priority to provisional patent application Serial No. 60/024,425 filed Aug. 20, 1996.

BACKGROUND OF THE INVENTION

The present invention relates generally to a computer interface and more particularly to a mouse having force feedback.

In the known computer interface, movement of a computer mouse in an X- and/or Y-direction on a table moves a cursor or other graphical element on a computer display in a corresponding direction. As is well known, the user operates numerous functions on a graphical user interface, such as pull down menus, activating icons, scrolling windows, etc. by moving the mouse and selectively activating a button on the mouse. The known computer mouse does not provide tactile or force feedback relating to the interaction between the cursor and computer generated objects on the screen, i.e. the user cannot "feel" the objects displayed on the screen.

As a result, many people have difficulty operating a computer mouse. For example, many people have difficulty "double clicking" on a computer icon because they inadvertently move the mouse while clicking twice, thereby dragging, rather than double clicking, the icon. The known computer mouse is particularly difficult to operate for the visually impaired or those with poor motor skills, poor hand-eye coordination or those with muscular or nervous disorders.

One proposed computer input device offers force feedback relating to the cursor interaction with objects on the computer screen. That device utilizes electromagnetic flat coil actuators to generate electromagnetic forces on a handle. However, the electromagnetic flat coil actuators utilized in this computer input device are expensive and generate strong magnetic fields which interfere with the operation of the computer or which could damage computer disks. This computer input device requires an additional computer dedicated solely to controlling the input device.

U.S. Pat. No. 4,604,016 discloses a hand controller having force feedback for teleoperation of a tool for surgery. The forces encountered by the tool are translated by a computer to torque motors, thereby providing a real time interactive feedback response enabling a surgeon to "feel" an operation. The position and orientation of the controller are determined by the lengths of twelve lines between the controller and the support structure. The twelve control lines are interconnected with the plurality of torque motors which are variably programmed by the computer to apply tension to each of the lines based upon the force encountered by the tool. This device is large and requires a large number of control lines and motors. The numerous control lines and motors complicate programming of software applications which could utilize the input device. Play in the numerous control lines and friction reduce the precision of the response and feedback of the device. The patent does not disclose force feedback based upon the interaction between a cursor and objects on a computer screen or force feedback based upon the movement of the input device.

SUMMARY OF THE INVENTION

The present invention provides a computer input device having force feedback which is less expensive and simpler than previously known computer input devices. The computer interface of the present invention further imparts a force on a mouse which is based upon the movement of the mouse, thereby providing friction and inertia compensation and the simulation of such effects as viscosity.

The computer interface generally comprises an input device and a display connected to a CPU. The input device generally comprises a mouse movable in two degrees of freedom (D.O.F.), preferably along an X-axis and a generally perpendicular Y-axis on a surface. Movement of the mouse in the X and Y-directions generally causes a corresponding movement of a cursor on the display. In a first embodiment, the mouse is slidably mounted to a first rail generally parallel to the X-axis. The first rail is in turn slidably mounted on a second rail for movement generally parallel to the Y-axis. A pair of motors and belts impart forces on the mouse along the X and Y axes. An encoder connected to each motor measures the movement of the mouse by the user or by the motors.

In a second embodiment, the mouse is fixed to a rail having a rack engaged by a gear and a motor imparting a force parallel to the Y-axis. The mouse, rail, rack, gear and motor are slidably mounted to a first rail for movement in the X-direction. A motor and belt impart a force on the mouse generally parallel to the X-axis. Each of the motors include a sensor for indicating the displacement of the mouse, preferably an encoder, from which velocity and acceleration, including direction, can be calculated.

Each of the motors, in either embodiment, impart force on the mouse along its associated axis based upon movement of the mouse. For example, a motor imparts a force upon the mouse to compensate for friction when it detects motion of the mouse along its associated axis. Each motor also imparts a force corresponding to detected acceleration of the mouse in order to compensate for inertia along the associated axis. Further, in order to provide a "viscous" feel in some areas of the display, the motors selectively impart a force upon the mouse which is generally linearly proportional to the detected velocity of the mouse, opposite the direction of the detected velocity.

In order to calibrate the input device in either embodiment, the mouse is driven by each of the motors to extreme positions along either axis until the mouse or its associated hardware contacts a stop. The CPU and input device detect the impact of the mouse with a stop at each extreme, thereby defining the range of motion of the mouse along each axis to calibrate the motion of the mouse with the motion of a cursor on a display. Alternatively the stops could comprise limit switches.

The computer interface also provides force feedback based upon the interaction of a cursor on a display. For example, in a graphical user interface, the user can "feel" icons, windows and menus on a display. The motors also assist the user in operating the graphical user interface, such as by preventing the cursor from inadvertently sliding off the side of a pull down menu or a scroll bar thumb.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF A PREFERRED EMBODIMENT

Figure 1:
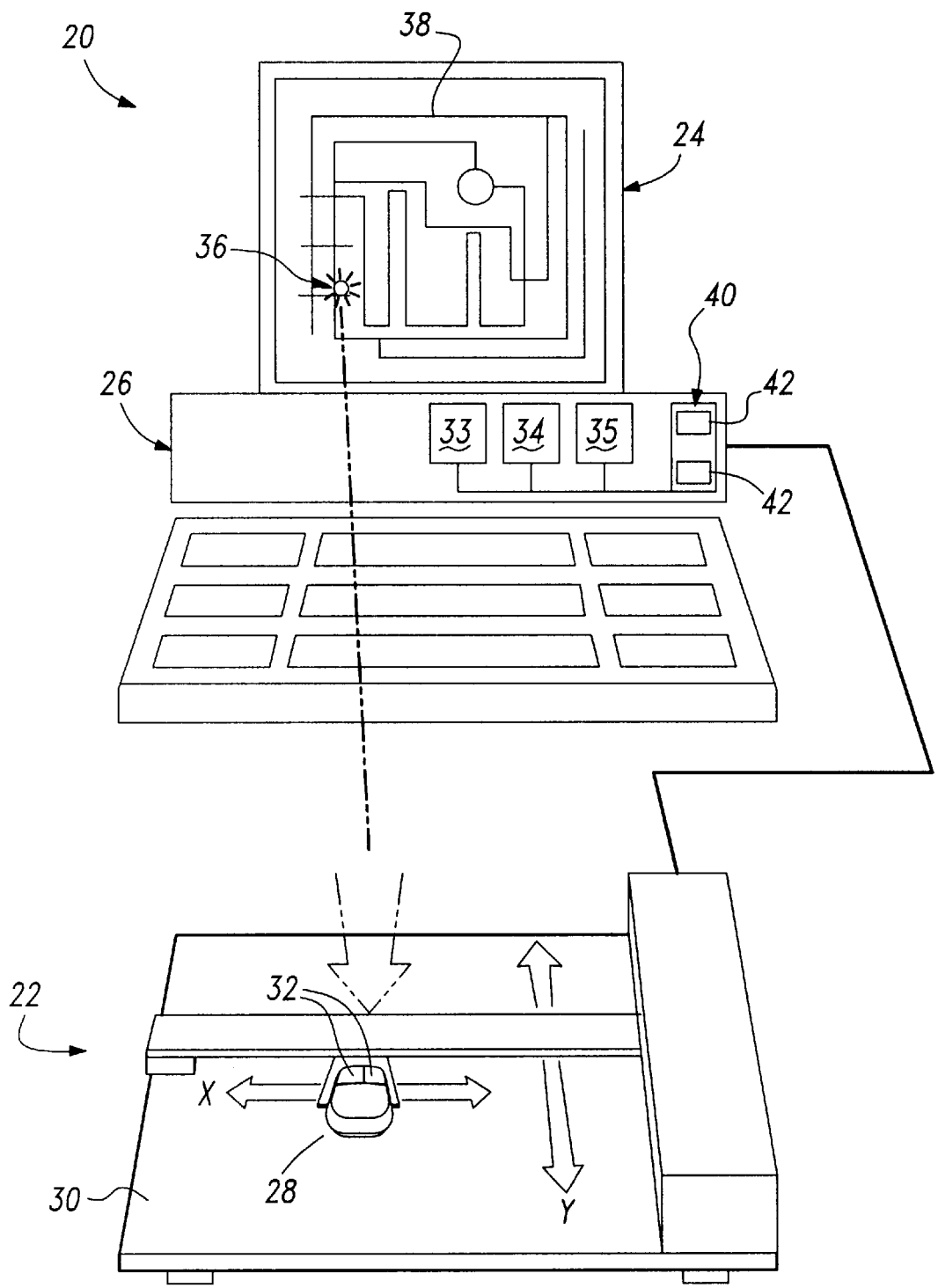
FIG. 1 is a schematic of the computer interface of the present invention.

The present invention provides a computer interface 20 including an input device 22 and a display 24 connected to a CPU 26 as shown in FIG. 1. The input device 22 generally includes a mouse 28 moveable in an X-direction and a Y-direction on surface 30 and including user activated buttons 32. Movement of the mouse 28 in the X and Y-directions typically results in a corresponding motion of a cursor 36 on the display 24 interacting with screen objects 38, such as simulated objects, or graphical user interface items such as menus, windows, slider bars, etc. "Cursor" 36 as used herein refers to any object on the display 24 which is directly controlled by movement of the mouse 28. A cursor 36 in a word-processing application will differ from that utilized in graphics applications, games, file-management applications, etc. Force feedback to the mouse 28 is controlled by a computer card 40 having a pair of servo drives 42.

Figure 2:
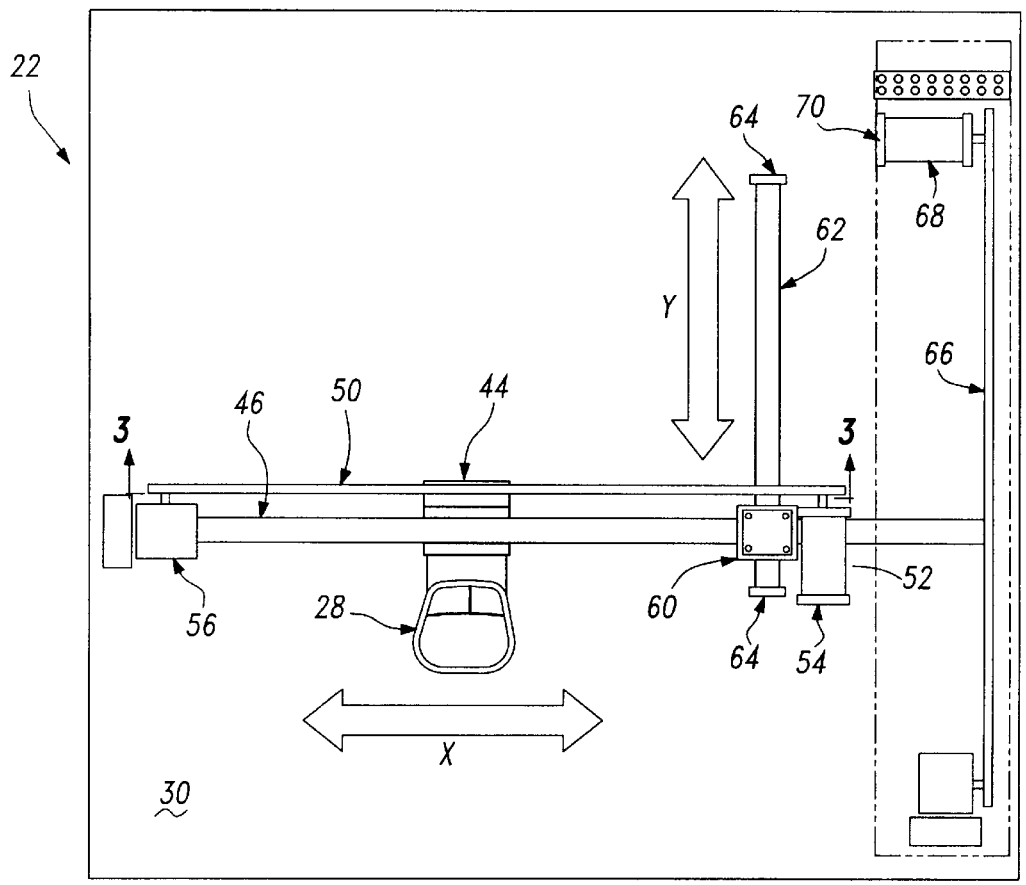
FIG. 2 is a top view of the computer input device shown in FIG. 1.

Referring to FIG. 2, the mouse 28 is mounted to an X-slide 44 which is slidably mounted on an X-rail 46 for movement along the X-axis. A non-slip belt 50 driven by a motor 52 imparts force on the mouse 28 and the X-slide 44 in either direction along the X-axis. The motor 52 includes a sensor 54 indicating the amount of movement of the mouse 28, preferably an encoder 54 or alternatively a resolver. The mouse 28 and X-slide are moveable along the X-rail between a stop 56 on an end of the X-rail 46 and a Y-slide 60 secured to the X-rail 46.

The Y-slide 60 is slidable in either direction along a Y-rail 62 extending along a Y-axis generally perpendicular to the X-axis. The motor 52, belt 50, X-rail 46, X-slide 44 and mouse 28 are all mounted to the Y-slide for movement together along the Y-axis between stops 64 at either end of the Y-rail 62. A belt 66 driven by a motor 68 having a encoder 70 imparts force on the Y-slide in either direction along the Y-axis.

Belts 50, 66, are preferably synchro mesh cable, available commercially from Stock Drive Products. The motors 52, 68 have a peak torque of at least 5 ounce-inches, and most preferably 10 ounce-inches. The motors 52, 68 are powered by servo drives 42 which preferably utilize pulse-width modulation. As is known for servo-controlled motors, the servo drives 42 regulate the current and voltage supplied to the motors 52, 68 and may at times monitor the consumption of current and voltage by the motors 52, 68 in order to precisely control the force generated by the motors 52, 68. The encoders 54, 70 preferably have a resolution of at least 1000 pulses per revolution and utilize quadrature decoding. Unlike a conventional mouse, the mouse 28 need not actually make direct contact with the surface 30 because movement of the mouse 28 is sensed by the encoders 54, 70 via the motors 52, 68.

Figure 3:
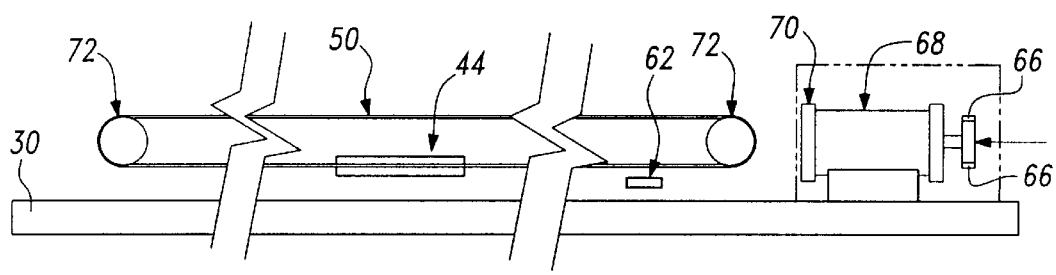
FIG. 3 is a sectional view taken along line 3—3 of FIG. 2.

As can be seen in FIG. 3, the belt 50 is looped around a pair of pulleys 72 and secured at either end to the X-slide 44. A single motor 52 directly driving one of the pulleys 72 drives the X-slide 44 in either direction along the X-axis. The Y-axis motor 68 having encoder 70 drives the belt 66 which imparts a force on the mouse 28 along the Y-axis.

In operation, movement of the mouse 28 along either the X-axis, Y-axis or a combination drives belts 50, 66 rotating motors 52, 68 and encoders 54, 70. The encoders 54, 70 generate signals indicative of the displacement and direction of the mouse 28. From these signals, the CPU 26 can derive the velocity, acceleration, etc of the mouse 28. The CPU 26 controls the servo drives 42 to control the motors 52, 68 to impart forces on the mouse 28 as will be described in more detail below. The forces imparted by motors 52, 68 are precisely controlled by servo drives 42. The servo drives 42 may also monitor the power consumption of motors 52, 68 at times.

Figure 4:
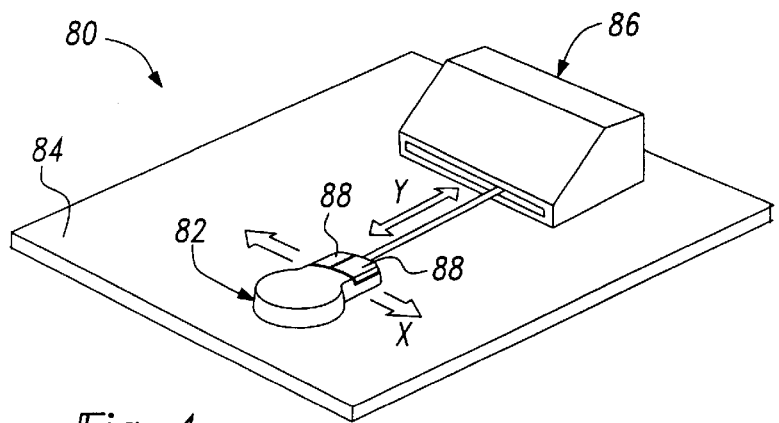
FIG. 4 is a perspective view of an alternate input device to use with the computer interface of FIG. 1.

An alternate input device 80 for use in the computer interface 20 of FIG. 1 is shown in FIG. 4 generally comprising a mouse 82 movable in two degrees of freedom (D.O.F.), such as along an X-axis and a Y-axis on a surface 84. The surface 84 can be secured to a housing 86 or can be a desktop or tabletop surface 84. It should be appreciated that, unlike a conventional mouse, the mouse 82 need not be located directly on a surface in order to operate, but preferably the mouse 82 is moveable in two degrees of freedom in a plane. The mouse 82 preferably includes a plurality of buttons 88.

Figure 5:
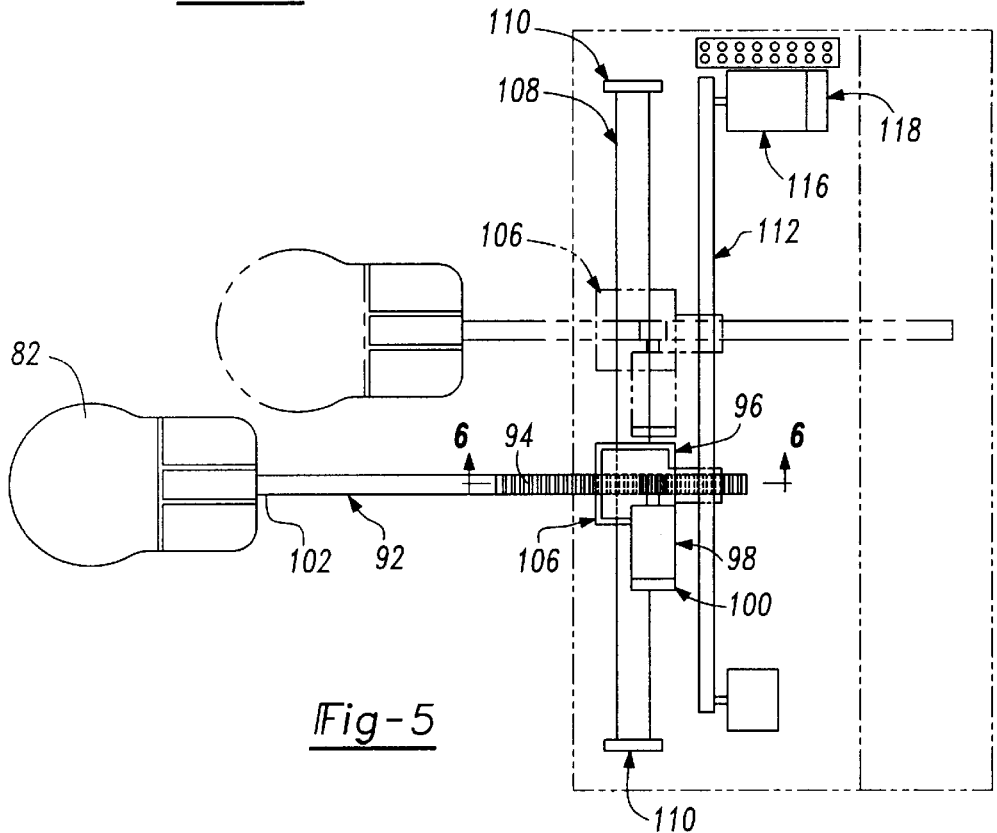
FIG. 5 is a top view of the input device of FIG. 4, partially broken away.

As can be seen in FIG. 5, the input device 80 includes a Y-rail 92 at least a portion of which comprises a rack 94 engaging a gear 96 driven by a motor 98 with an encoder 100. The mouse 82 is fixed to an end 102 of Y-rail 92. The Y-rail 92 is slidably mounted for movement along the Y-axis on X-slide 106. The X-slide 106 is slidably mounted for movement along the X-axis on X-rail 108 between a pair of stops 110. A belt 112 driven by a motor 116 having an encoder 118 imparts a force along the X-axis to the X-slide 106 which transmits the force to the Y-rail 92 and the mouse 82. Unlike a conventional mouse, the mouse 82 need not actually make direct contact with the surface 84 because movement of the mouse 82 is sensed by encoders 100, 118 via the motors 98, 116.

Figure 6:
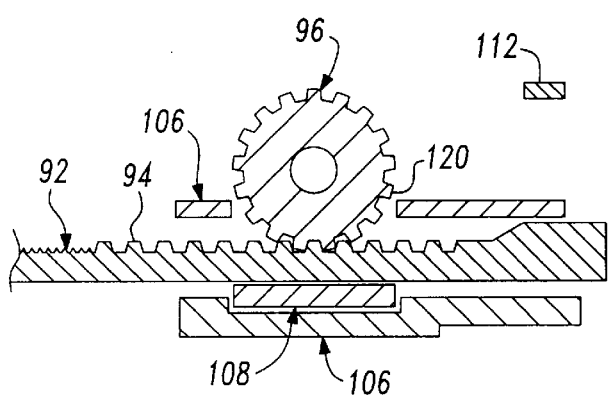
FIG. 6 is a sectional view of the input device of FIG. 5 taken along line 6—6.

Referring to FIG. 6, the gear 96 driven by motor 98 engages the rack portion 94 of Y-rail 92 through an opening 120 in X-slide 106. As can be seen in FIG. 6, the Y-rail 92 is slidably mounted on the X-slide 106 for relative motion along the Y-axis. The X-slide is slidably mounted on the X-rail 108 to provide relative motion in the X-directions. Preferably, the motors 98, 116 and encoders 100, 118 are the same as those described in the first embodiment.

In operation, movement of the mouse 82 along the surface 84 generates a signal to be sent to the CPU 26 from the encoders 100, 118. Movement of the mouse 82 along the Y-axis causes the rack portion 94 of the Y-rail 92 to drive the gear 96 and the motor 98. The encoder 100 connected to the motor 98 generates a signal indicating the displacement of the mouse 82 along the Y-axis. Movement of the mouse 82 along the X-axis moves the X-slide 106 along the X-axis, thereby driving belt 112 and motor 116 and causing the encoder 118 to generate a signal indicating the displacement of the mouse 82 in the X-axis. The CPU 26 controls the servo drives 42 to power the motors 98, 116 to impart forces on the mouse 82, in a manner which will be described in more detail below.

Figure 10:
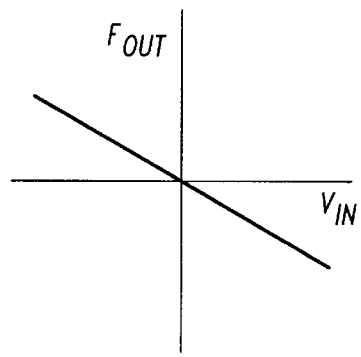
FIG. 10 is a graph of a method for providing a viscous force feedback for the computer input device of FIG. 1 or FIG. 4.
Figure 11:
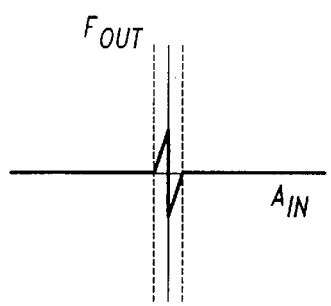
FIG. 11 is a graph of a method for providing the feel of a wall in the computer interface of FIG. 1.
Figure 12:
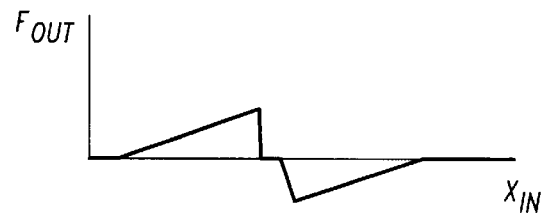
FIG. 12 is a graph of a method for providing the feel of gravity or a potential well for the computer interface of FIG. 1.
Figure 13:
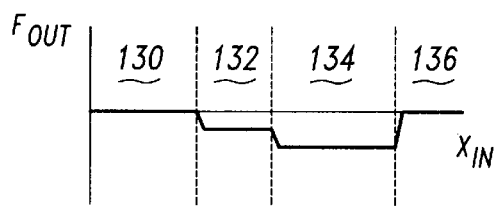
FIG. 13 is a graph of a method for providing variable friction areas in the computer interface of FIG. 1.

FIGS. 7–13 indicate the methods of controlling the motors 98, 116 to impart a force upon the mouse 82. FIGS. 7–13 will be described specifically with respect to the embodiment shown in FIGS. 4–6 for purposes of illustration only. These methods are equally applicable to the embodiment shown in FIGS. 1–3. FIGS. 7–10 are graphs of the output of the motors 98, 116 based upon input from the mouse 82, either through the encoders 100, 118. FIGS. 11–13 indicate the output of motors 98, 116 as seen by the mouse 82 based upon the position of a cursor 36 on the display 24. Generally, two or more of the forces indicated by the graphs in FIGS. 7–13 can be superimposed to provide several effects simultaneously.

The input device 80 preferably includes compensation for friction which would be experienced by the Y-rail 92 and the X-rail 108. As is known, friction generates a force opposite the direction of the movement of the mouse 82. Preferably the CPU 26 compensates for this force of friction by controlling the servo drives 42 to send current and voltage to the motors 98, 116 sufficient to cancel the force of friction. The CPU 26 monitors the velocity of the mouse 82 by monitoring the signal from the encoders 100, 118. As can be seen from FIG. 7, when the mouse 82 begins to move, the motors 98, 116 impart a force on the mouse 82 in the same direction as the velocity of the mouse 82 and of a magnitude equal to the force of the friction. This friction compensation occurs independently along the X-axis and Y-axis.

Figure 8:
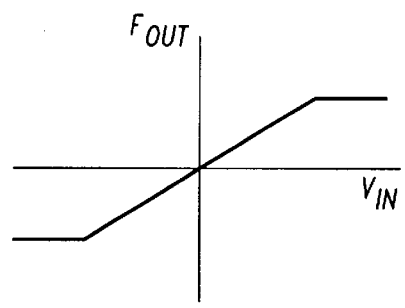
FIG. 8 is a graph of an alternate method for compensating for friction in the computer input device shown in FIG. 1 or FIG. 4.
Figure 9:
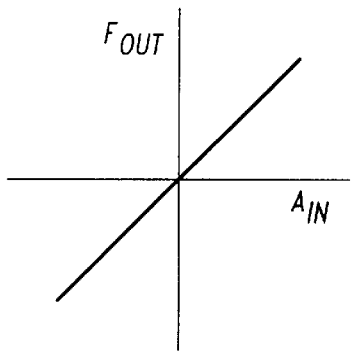
FIG. 9 is a graph of a method for compensating for inertia in the computer input device of FIG. 1 or FIG. 4.

An alternative method for compensating for friction is indicated by the graph shown in FIG. 8. The velocity of the mouse 82 is continuously monitored by the CPU 26. The CPU 26 controls the servo drive 42 and motors 98, 116 to impart a force upon the mouse 82 in the same direction as the input velocity $v_{in}$ measured from the mouse 82. Again this friction compensation would be performed independently along the X-axis and Y-axis by the motors 98, 116.

The input device 80 preferably also compensates for the inertia of the mouse 82 and associated hardware. The CPU 26 monitors the acceleration, both positive and negative of the mouse 82 by monitoring the encoders 100, 118. The CPU 26 then calculates a force $F_{out}$ which, based upon the mass of the mouse 82 and hardware moveable along the appropriate axis, would result in an acceleration equal or slightly less than the acceleration input, $A_{in}$. This inertia compensation provides both negative and positive acceleration to the mouse 82. The inertia compensation is also implemented independently on the X-axis and Y-axis, based upon the characteristics of the specific hardware, including mass, which is moveable along that axis.

FIG. 10 indicates a method for providing a viscous force feedback to the mouse 82. The force generated by the motors 98, 116 in a manner described above is imparted in a direction opposite to the movement of the mouse 82. Further, the imparted force is increased in magnitude as the velocity of the mouse 82 movement $V_{in}$ increases, thereby creating a "viscous" feel as the user moves the mouse 82.

FIGS. 11–13 indicate methods for imparting a force upon the mouse 82 wherein the force depends upon the position of the cursor 36 on the display 24, relative to other objects 38 on the display 24. Although the graphs will be described with respect to displacement along the X-axis, the same methods would be used for imparting a force upon the mouse 82 in the Y-axis.

FIG. 11 indicates force imparted on the mouse 82 in the X-axis based upon the position of the cursor 36 relative to an object 38 on the display 24. As can be seen from the graph, motion of the cursor 36 across the display 24 is free from any force resistance until the cursor 36 contacts screen object 38, which in this case would "feel" like the cursor 36 is contacting a wall. As the cursor 36 contacts the screen object 38, the motor 52 imparts a force opposite the direction of the movement of the cursor 36. The mouse 82 is moved through the screen object 38 against the resistive force until the cursor 36 is past the center of the screen object 38, where the resistive force reverses and "pushes" the cursor 36 and mouse 82 off of the screen object 38 where the force returns to zero. Again, preferably two or more of the forces indicated by the graphs in FIGS. 7–13 would be superimposed in order to compensate for friction and inertia and provide a response relative to the position of the cursor 36 on the display 24.

FIG. 12 indicates a method for providing the feel of gravity or a potential well. In this graph, the force, $F_{out}$, provides an attractive force to the center of a screen object 38. As the cursor 36 is moved from left to right across a screen object 38, the motor 52 first provides a force toward the center of the screen object 38 in the same direction as the movement of the mouse 82. The force imparted on the mouse 82 then drops to zero in the center of the screen object 38. As the cursor 36 continues to move from left to right from the center of the screen object 38, the motor 52 provides a high resistive force, which gradually decreases as the cursor 36 moves off of the screen object 38. In this manner, the screen object 38 "feels" like a detent or potential well. A similar method imparts a force upon the mouse 82 when the cursor 36 is moved along the Y-axis across the screen object 38 or from right to left across the screen object 38. Generally, within the screen object 38, a force is imparted on the mouse 82 toward the center of the screen object 38.

As shown in FIG. 13, the motor 52 can be used to impart a force to the mouse 82 simulating different levels of friction. For example, moving the cursor 36 from left to right across the display, the motor 52 could impart zero force resistance in a first area 130, slight resistance force in the second area 132, high resistance force in a third area 134 and return to zero resistive force in a fourth area 136. The first, second, third and fourth, 130, 132, 134, 136 could be different screen objects 38. In this manner, the user can "feel" the different screen objects 38 on the display 24. Again, the same method is used for movement of the mouse along the Y-axis. Alternatively another effect, such as viscosity, or some combination of effects could be used other than friction.

Figure 14:
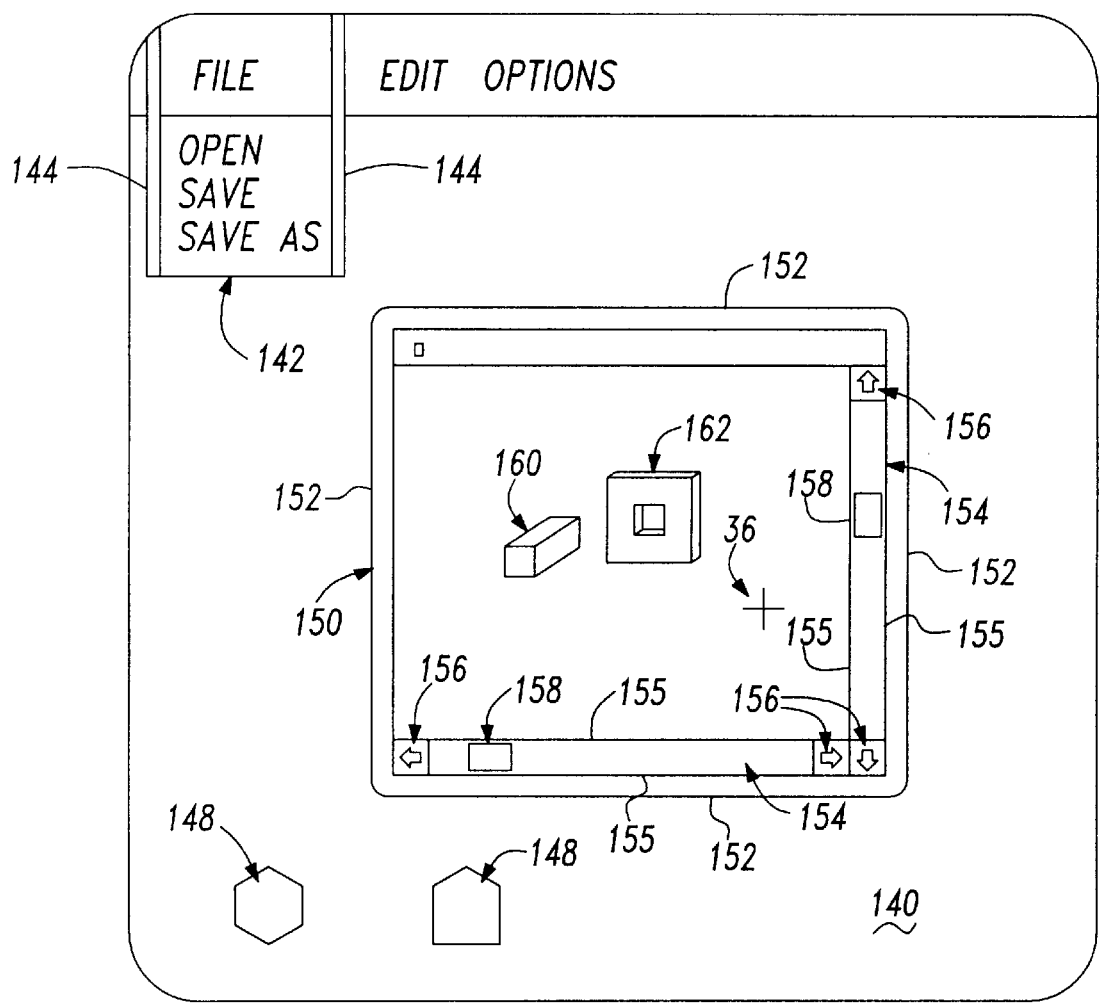
FIG. 14 is one potential screen displayed by the display of FIG. 1.

FIG. 14 shows one possible screen 140 to be displayed by display 24 including a pull down menu 142 having side edges 144. The screen 140 further includes a plurality of icons 148 and a window 150 having edges 152 about its periphery. The window 150 further includes a pair of slider bars 154 having side edges 155 for scrolling through the information displayed in window 150, either by clicking on one of a plurality of arrows 156, or by dragging one of the two boxes 158, in a manner well known to computer users.

The window 150 may display simulated objects 160 and 162, such as in a game or a CAD or engineering program. The simulated objects 160, 162 can be dragged or rotated utilizing the cursor 36 in a manner common to many computer programs.

Figure 7:
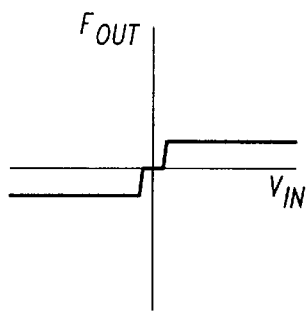
FIG. 7 is a graph showing a method for compensating for friction for the computer input device of FIG. 1 or FIG. 4.

The operation of the embodiment shown in FIGS. 4–6 of the computer input device 80 will be described with respect to FIG. 14 for purposes of illustration only; operation of the embodiment shown in FIGS. 1–3 would be identical. Preferably, movement of the mouse 82 over surface 84 along the X-axis or Y-axis causes a corresponding movement of cursor 36 on the screen 140 of display 24. Generally, the motors 98, 116 preferably operate to compensate for friction in the computer input device 80 utilizing either a constant stepped force output as shown in FIG. 7 or a linear force output preload as shown in FIG. 8. Further, the motors 98, 116 also compensate for inertia as described with respect to the graph shown in FIG. 9.

Preferably the side edges 144 of the pull down menu 142 are simulated elastic bands utilizing force output proportional to the distance from the center of the pull down menu 142 in the X-direction only. Further, each item selectable from the menu provides an elastic resistance force against the mouse 82 as the mouse 82 is moved in the Y-direction. As the mouse 82 moves the cursor 36 along the Y-direction across the pull down menu 142, each item in the menu provides an elastic force attracting the cursor 36 toward the center of each item, until the cursor 36 is moved onto another item. In this manner, the user can "feel" the pull down menu 142 and the items on the menu 142 and avoid inadvertently slipping off the left or right edges 144 of the pull down menu 142.

Similarly, the edges 152 of the window 150 are also "walls" as shown in FIG. 11. The left and right edges 152 form walls in the X-axis and the top and bottom edges 152 of the window 150 form walls along the Y-axis. In this manner, the user can "feel" the periphery of the window 150.

The slider bars 154 operate similarly to the pull down menu 142. Once the user begins to drag a box 158, the side edges 155 of the slider bar 154 become "walls" as shown in the graph of FIG. 11. In this manner, the user can "feel" the slider bar 154, moving the cursor 156 and box 158 freely lengthwise across the slider bar 154 axis while preventing the user from inadvertently moving the cursor off of the slider bar 154.

The computer interface 20 further preferably provides icons 148 which simulate "gravity" or a potential well or detent. By moving the mouse 82, the user moves the cursor 36 near one of the icons 148. When the cursor 38 is on or near the icon 148, the motors 98, 166 impart a force on the mouse 82 toward the center of the icon 148. While the mouse 82 is being moved away from the center of the icon 148, the motors 98, 116 impart a force toward the center of the icon 148, offering resistance. When the cursor 36 is moved off of icon 148, this force is eliminated. In this manner, the user can "feel" the icons 148. Further, this will assist the user in double clicking on the icon 148 without inadvertently dragging the icon 148 between clicks.

Alternatively, or in addition to those effects described above, moving the cursor 36 across the screen 140 can provide different areas of friction resistance. For example, the screen 140 outside of window 150 provides zero friction area as in area 130 of FIG. 13. The window 150 provides a second area 132 of slight friction. The object 162 is the third area 134 of high friction and the center 164 of the object 160 is the fourth area 136 of zero friction. Again, the computer input device 80 would provide more than one of the force outputs in FIGS. 7–13, with the multiple force graphs superimposed upon each other.

The computer interface 20 of the present invention provides a relatively inexpensive, simple computer input device 22, 80 imparting a force output on a mouse 28, 82 which is based upon the movement of the mouse 28, 82, thereby providing friction and inertia compensation and the simulation of effects such as viscosity. The computer interface 20 further provides force feedback relative to the position of a cursor 36 on a display 24, thereby enabling a user to "feel" the objects 38 on the display 24.

In accordance with the provisions of the patent statutes, the present invention has been described in what is considered to represent its preferred embodiment. However, it should be noted that the invention can be practiced otherwise than as specifically illustrated and described without departing from its spirit.

What is claimed is:

1. A computer interface comprising:
    a mouse moveable generally in a plane in a first degree of freedom and a second degree of freedom;
    a display displaying a cursor at a plurality of positions on said display based upon movement of said mouse; and
    a first motor imparting a force on said mouse along said first degree of freedom, said mouse moveable relative to said first motor in said plane in said first degree of freedom.

2. The computer interface of claim 1 further including:
    a second motor imparting a force on said mouse along said second degree of freedom, said mouse moveable relative to said second motor in said plane in said second degree of freedom.

3. The computer interface of claim 1 wherein said first degree of freedom is a first axis and said second degree of freedom is a generally perpendicular second axis.

4. The computer interface of claim 3 wherein said first motor imparts said force in a first direction and an opposite second direction along said first axis.

5. The computer interface of claim 1 further including a first sensor generating a first signal based upon movement of said mouse along said first degree of freedom.

6. The computer interface of claim 5 further including a second sensor generating a second signal based upon movement of said mouse along said second degree of freedom.

7. The computer interface of claim 6 wherein said cursor moves on said display based upon said first signal from said first sensor and said second signal from said second sensor.

8. The computer interface of claim 5 wherein said first motor imparts a force on said mouse based upon said first signal from said first sensor.

9. The computer interface of claim 5 wherein said first sensor is an encoder generating pulses based upon movement of said mouse.

10. The computer interface of claim 1 wherein said first motor imparts force on said mouse based upon said position of said cursor on said display.

11. The computer interface of claim 1 wherein said first motor imparts force on said mouse based upon said movement of said mouse.

12. The computer interface of claim 3 further comprising:
    a first rail extending generally parallel to said first axis; and
    said mouse slidably mounted on said first rail.

13. The computer interface of claim 12 further comprising:

a second rail extending generally parallel to said second axis; and said mouse slidably mounted on said second rail.

14. The computer interface of claim 13 wherein said second rail is slidably mounted on said first rail for movement generally parallel to said first axis.

15. The computer interface of claim 12 further including:

a second rail mounted to said mouse; and a second motor imparting a force on said second rail and said mouse generally parallel to said second axis.

16. The computer interface of claim 15 wherein said second rail includes a rack, said second motor driving a gear engaging said rack.

17. The computer interface of claim 16 wherein said second rail is slidably mounted on said first rail for movement generally parallel to said first axis.

18. The computer interface of claim 17 wherein said first motor drives a gear engaging a belt to impart force upon said mouse along said first axis.

19. The computer interface of claim 1 wherein said first motor imparts said force on said mouse based upon a first signal from a first sensor, said force compensating for friction encountered during said movement of said mouse along said first degree of freedom.

20. The computer interface of claim 1 wherein said force imparted by said first motor is based upon a first signal from a first sensor, said force generally compensating for inertia encountered during said movement of said mouse along said first degree of freedom.

21. The computer interface of claim 1 further including a first stop and a second stop at opposite extremes of movement of said mouse along said first degree of freedom said first motor moving said mouse to said first stop and to said second stop along said first degree of freedom, said computer interface further receiving a feedback signal indicating when said mouse abuts said first stop and said second stop, thereby defining a range of motion along said first degree of freedom and calibrating said computer interface along said first degree of freedom.

22. A computer input device comprising:

a mouse moveable generally in a plane along a first degree of freedom and a second degree of freedom, movement of said mouse generating a signal to be input to a computer; and a first motor imparting a force on said mouse along said first degree of freedom based upon a velocity of said mouse along said first degree of freedom.

23. The computer input device of claim 22 wherein said first motor imparts said force on said mouse based upon a first signal from a first sensor, said force compensating for friction encountered during said movement of said mouse along said first degree of freedom.

24. The computer input device of claim 23 wherein said first sensor determines the velocity of mouse movement along said first degree of freedom, said first motor imparting force based upon said velocity in order to compensate for friction.

25. The computer input device of claim 24 wherein said force imparted by said first motor is selected to move said mouse along said first degree of freedom generally at said velocity.

26. The computer input device of claim 22 wherein said force imparted by said first motor is based upon a first signal from a first sensor, said force generally compensating for inertia encountered during said movement of said mouse along said first degree of freedom.

27. The computer input device of claim 22 wherein said first sensor determines acceleration along said first degree of freedom, said force imparted by said first motor on said mouse being generally proportional to said acceleration, thereby compensating for inertia.

28. The computer input device of claim 27 wherein said force increases substantially linearly with said acceleration.

29. The computer input device of claim 22 further including a first stop and a second stop at opposite extremes of movement of said mouse along said first degree of freedom, said first motor moving said mouse to said first stop and to said second stop along said first degree of freedom, said computer interface further receiving a feedback signal indicating when said mouse abuts said first stop and said second stop, thereby defining a range of motion along said first degree of freedom and calibrating said computer interface along said first degree of freedom.

30. The computer input device of claim 29 wherein said feedback signal is generated by a first sensor.

31. The computer input device of claim 22 further comprising:

a display displaying at least one computer-generated object, said display modifying said object relative to said display based upon movement of said mouse.

32. The computer input device of claim 22 further comprising a first rail generally parallel to a first degree of freedom, said mouse slidably mounted on said first rail.

33. A computer interface comprising:

a mouse moveable generally in a plane along a first axis and a generally perpendicular second axis;

a display displaying a cursor at a plurality of positions on said display based upon movement of said mouse;

a first rail extending generally parallel to said first axis;

said mouse slidably mounted on said first rail;

a first motor imparting a force on said mouse in a first direction and an opposite second direction along said first axis; and a second motor imparting a force on said mouse in a first direction and an opposite second direction along said second axis.

34. The computer interface of claim 33 wherein said first motor and said second motor impart force on said mouse based upon said movement of said mouse.

35. The computer input device of claim 22 wherein said mouse is moveable relative to said first motor.

36. A computer input device comprising:

a mouse moveable generally in a plane in a first degree of freedom and a second degree of freedom;

a rack engaging said mouse in said first degree of freedom; and a first motor engaging said rack along said first degree of freedom thereby imparting a force on said mouse in said first degree of freedom.

37. The computer input device of claim 36 wherein said mouse is moveable relative to said first motor in said first degree of freedom.

38. The computer input device of claim 37 further including a second motor imparting a force on said mouse in said second degree of freedom wherein said mouse is moveable relative to said second motor in said second degree of freedom.

39. The computer input device of claim 38 further including a display displaying a cursor at a plurality of positions on said display based upon movement of said mouse.

40. A computer input device comprising:
- a mouse moveable generally in a plane along a first degree of freedom and a second degree of freedom, movement of said mouse generating a signal to be input to a computer; and
- a first motor imparting a force on said mouse along said first degree of freedom, said mouse moveable relative to said motor in said first degree of freedom.

41. The computer input device of claim 40 further including a second motor imparting a force on said mouse in said second degree of freedom wherein said mouse is moveable relative to said second motor in said second degree of freedom.

42. The computer input device of claim 41 further including a display displaying a cursor at a plurality of positions on said display based upon movement of said mouse.

43. A computer input device comprising:
- a mouse moveable generally in a plane along a first axis and a second axis, movement of said mouse generating a signal to be input to a computer;
- a first rail extending generally parallel to said first axis;
- said mouse slidably mounted on said first rail; and
- a first motor imparting a force on said mouse in said first axis.

44. A computer input device comprising:
- a mouse moveable generally in a plane along a first degree of freedom and a second degree of freedom, movement of said mouse generating a signal to be input to a computer;
- a first motor imparting a force on said mouse along said first degree of freedom;
- a first stop and a second stop at opposite extremes of movement of said mouse along said first degree of freedom said first motor moving said mouse to said first stop and to said second stop along said first degree of freedom, said computer input device further receiving a feedback signal indicating when said mouse abuts said first stop and said second stop, thereby defining a range of motion along said first degree of freedom and calibrating said computer input device along said first degree of freedom.

45. The computer input device of claim 44 further including:
- a second motor imparting a force on said mouse along said second degree of freedom;
- a third stop and a fourth stop at opposite extremes of movement of said mouse along said second degree of freedom said second motor moving said mouse to said third stop and to said fourth stop along said second degree of freedom, said computer input device further receiving a feedback signal indicating when said mouse abuts said third stop and said fourth stop, thereby defining a range of motion along said second degree of freedom and calibrating said computer input device along said second degree of freedom.

46. The computer input device of claim 45 wherein said mouse is moveable relative to said first motor in said first degree of freedom and said mouse is moveable relative to said second motor in said second degree of freedom.

47. The computer input device of claim 46 further including a display displaying a cursor at a plurality of positions on said display based upon movement of said mouse.

* * * * *